(12) United States Patent
Lackey (10) Patent No.: US 7,370,573 B1
(45) Date of Patent: *May 13, 2008

(54) METHOD AND APPARATUS FOR FORMING MODULES FROM HARVESTED CROPS

(76) Inventor: Weldon Leroy Lackey, Suite 900 607 Fourteenth St., N.W., Lovington, NM (US) 20005

( * ) Notice: Subject to any disclaimer, the term of this patent is extended or adjusted under 35 U.S.C. 154(b) by 364 days.

This patent is subject to a terminal disclaimer.

(21) Appl. No.: 11/028,049

(22) Filed: Jan. 4, 2005

Related U.S. Application Data (63) Continuation of application No. 10/672,858, filed on Sep. 25, 2003, now Pat. No. 6,845,709, which is a continuation of application No. 10/180,108, filed on Jun. 27, 2002, now Pat. No. 6,651,417.

(51) Int. Cl.
*B30B 15/30* (2006.01)
*A01B 39/00* (2006.01)

(52) U.S. Cl. .................... 100/35; 100/100; 100/214; 56/341

(58) Field of Classification Search ............ 100/2, 100/3, 7, 8, 35, 41, 100, 177, 178, 179, 192, 100/214, 215, 240, 245, 226; 56/153, 166, 56/173, 341, 344
See application file for complete search history.

(56) References Cited

U.S. PATENT DOCUMENTS 3,039,383 A * 6/1962 Windle et al. ............ 100/240
3,917,343 A * 11/1975 Taylor et al. ............ 298/23 DF
4,452,134 A 6/1984 Muse ........................ 100/90
4,548,131 A 10/1985 Williams ...................... 100/1
4,553,378 A 11/1985 Fachini et al. ............. 56/16.6
6,032,446 A 3/2000 Gola et al. ................... 56/341
6,651,417 B1 * 11/2003 Lackey ....................... 56/341
6,845,709 B1 * 1/2005 Lackey ......................... 100/1

* cited by examiner

*Primary Examiner*—Jimmy T. Nguyen
(74) *Attorney, Agent, or Firm*—McAfee & Taft (57) ABSTRACT

Module builder including holding chamber, wheeled frame towable behind a harvester; compaction chamber, compaction device, forming chamber, door assembly. The compaction chamber having compaction surface oriented between and substantially perpendicular to compaction chamber sidewalls. Compaction surface is nominally vertical and translatable through the compaction chamber at vertical and near-vertical. The compaction chamber is situated to receive material from the holding chamber. Compaction device are coupled to the compaction surface, and operative to translate it in a substantially horizontal direction through the compaction chamber at vertical and near vertical. The forming chamber is aligned with the compaction chamber trailing edge. The forming chamber door assembly includes a substantially vertical door frame at least spanning the forming chamber trailing edge, and is movable toward and away from the forming chamber along the wheeled frame. The door assembly also includes two doors mounted on the frame and movable between open and closed states.

10 Claims, 9 Drawing Sheets

METHOD AND APPARATUS FOR FORMING MODULES FROM HARVESTED CROPS

CROSS REFERENCE TO RELATED APPLICATIONS

This application is a continuation of application Ser. No. 10/672,858, filed Sep. 25, 2003 now U.S. Pat. No. 6,845,709, which is a continuation of application Ser. No. 10/180,108, filed Jun. 27, 2002, now U.S. Pat. No. 6,651,417. The disclosure presented in this application is the same as that presented in the original application.

FIELD OF THE INVENTION

The present invention relates generally to systems and methods for forming of modules from harvested crops. Specifically, preferred embodiments of the invention relate to forming cotton modules from loose cotton.

BACKGROUND OF THE INVENTION

Over the last half century, harvesting techniques for cotton have lagged behind the typical progression of innovations in this particular farm commodity. While planting and cultivating practices have become efficient enough to successfully plant and cultivate in eight-row, ten-row, and twelve-row patterns, cotton harvesting patterns have largely remained a half-century behind in a four-row pattern. Although some six-row and eight-row cotton harvesting systems are emerging, they are not successful on a large scale. They too typically have the problems common to four-row harvesting systems, e.g., the inability to quickly and efficiently dispose of the loose harvested cotton from harvester enclosures. Cotton in loose form is difficult to store and handle efficiently. Attempts at creating commercially available methods of moving the loose cotton from the harvester enclosures directly to compacted cotton have met with limited success. This bottleneck creates a variety of problems that hinders the speed of harvest and has inadvertently stagnated further development in this particular area.

Harvesters and module builders used today have designs that are not conductive to normal progressive expansion or innovations. Typical present day harvesters remove cotton from the stalk and deposit it in loose form into an onboard enclosure commonly called a basket. This basket has a finite capacity; harvesting must be stopped periodically and the loose cotton conveyed to another machine for compaction. That other machine is commonly called a cotton module builder. The cotton module builder is transportable except during the cotton module-building phase. Normally the module builder is placed outside a cotton field in close proximity to the area being harvested. Conveyance of cotton from the basket is done either directly or by means of yet another mobile transfer receptacle. In present day use, the typical module-building machine is a rectangular box that is open-topped and floorless. Above the box is a compressing ram that traverses the length of the module incrementally compacting the loose cotton deposited from the harvester. Once a module is started it must be finished on that site; causing the harvesters contents to be delivered to one site for a finite period of time. Building modules in this fashion generally results in modules of uneven density. Such modules are more susceptible to breakage during handling and storage than modules of uniform sufficient density. In addition, top-built modules typically require a finishing compaction cycle. The finishing compaction cycle, along with the time typically required to move and then set up the module builder again, contributes to inefficiency in the harvesting and compaction process.

Other drawbacks shared by typical top-built module builders become evident in the filling cycles of these machines. In order to convey the harvester's contents to the module builder the harvester must be close enough to the module builder, or transfer receptacle, that the harvester does not lose stability in the dumping process. This close proximity to the module builder, or transfer receptacle, impedes the harvester from being equipped with a wide, eight-, ten-, or twelve-row harvest pattern. The harvester's finite enclosure also requires harvesting to be stopped until the enclosure can be emptied. This time delay, along with the time delay in transport of the cotton, and the time delays in the stationary building process presents potential loses to vulnerable cotton crops ready for harvest. The present invention addresses a majority of these problems by giving portability to the module building process offering a cotton producer several options heretofore unavailable.

Although other related art can be found, most has been met with limited success. In one instance, U.S. Pat. No. 4,553,378 to Fachini et al. ('378) discloses an auger screw which limits its ability to produce even module density. The auger mode of compaction could create an over-compaction in the center of the module potentially causing seed damage while under-compacting the module corners. In addition, the '378 patent discloses no means for separating one module from the next. Tearing the module (a means inferable from the '378 disclosure) would likely compromise the structural integrity of the module.

Further examination of this reference calls into question it's ability to construct industry accepted standard size modules because of its on board limitations. Harvesters used today must be able to follow a cotton producers typical end row turning width limitations. For this on board system to build a standard size module, the harvester would have an excessive length that would not typically be able to turn and properly realign for the next pass without loss of harvestable cotton. A typical cotton stripper is approximately 18 feet to 20 feet long. A standard module is 30 feet to 32 feet long. The two combined would be approximately 40 feet to 45 feet long. The typical end row turning space is 25 feet to thirty feet. Proper alignment of the machine would result in approximately 10 feet to 20 feet of un-harvested or poorly harvested cotton—unacceptable to most producers.

U.S. Pat. No. 4,548,131 Mobile Apparatus for the Infield Handling of Fibrous Material to Williams ('131) appears to have several limiting factors. For example, it appears to be limited to a non-continuous mode of operation. The labor in the control cabin required to operate these cycles is also undesirable. Another example is its inability to build a standard size module, i.e., 8 feet wide by 9 feet tall by 30 feet long. The dispersal of fibroid material through what appears to be a horizontally stationary duct system into the bale hopper makes no provisions for even dispersal into an elongated rectangular shape, which is the industry, standard. Very few gins have the capacity to handle cotton in any form except a standard size module. Most modern gins have invested in expensive automatic module feeders for their gin plants.

BRIEF SUMMARY OF THE INVENTION

Preferred embodiments of the present invention include a cotton module building apparatus constructed on a wheeled frame with an end-built, reciprocating, compression chamber on the front portion of the frame. The chamber receives non-compacted cotton and outputs a compacted cotton module of substantially uniform density. The compacted module is delivered to an onboard movable floor enabling the off-loading of the module at any designated site, even while harvesting continues. This apparatus for, and associated method of, cotton module construction enables the module building process to be continuously repeated while harvesting continues, substantially eliminating the down time associated with transferring loose cotton to a module builder that must remain stationary during the module building process. The module builder has the portability to be used stationary at different sites during the construction of one module or in tow behind a typical cotton harvester. Time is of the essence during a cotton harvest. Cotton producers can reap enormous benefits if they can make their harvest machinery significantly more productive.

DETAILED DESCRIPTION

Preferred embodiments of the present invention include both an apparatus and method for modulating cotton.

Figure 1:
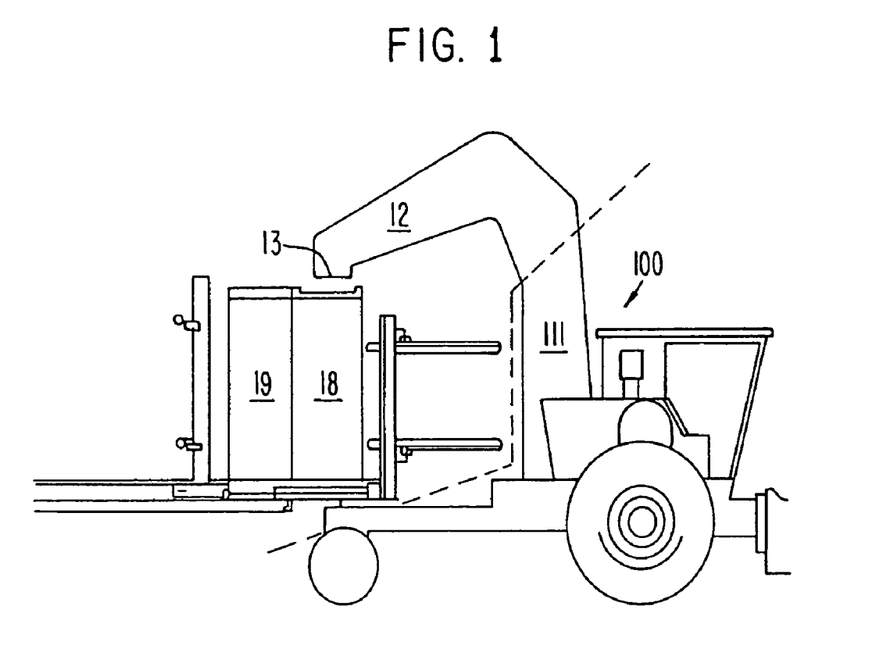
FIG. 1 is a side view illustrating a preferred embodiment of the present invention in a pre-loading state and connected to a harvester.

FIG. 1 is a side view of an apparatus of the present invention used within a harvesting system to enhance the speed and efficiency with which cotton can be harvested. Preferred embodiments of the present invention include a holding chamber 12. The holding chamber 12 is attached to a harvester 100 in a manner that allows harvested material to be collected and then gravity fed through a door 13 at one end of the chamber 12. The door 13 is positioned above a compression chamber 18 that, in preferred embodiments, sits substantially centered on the pivot point of the wheeled main frame. In some embodiments, the compression chamber 18 is tapered to form a standard-sized module. Cotton is delivered to the holding chamber 12 above a compaction chamber 18 through the harvester's air delivery system 111. Cotton is temporarily held in the holding chamber 12 until the compression stroke returns to a forward position, e.g., 30, sufficient to allow cotton released from the holding chamber 12 to fall into the compaction chamber 18. At this position, the door 13 at the bottom of the holding chamber 12 opens, releasing cotton into the compaction chamber 18. This door 13 remains open until limit switches (not shown) in the compaction chamber 18 are activated. This predetermined level of fill triggers the holding chamber door 13 to close and the compression cycle to begin.

Figure 2:
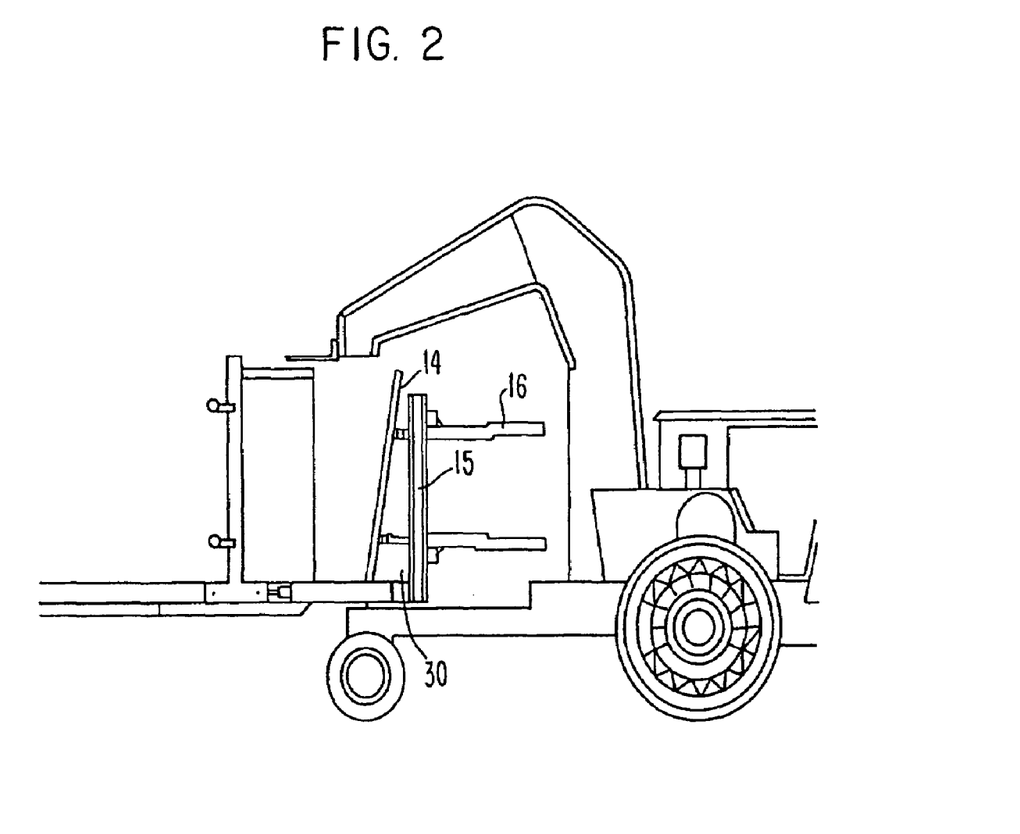
FIG. 2 is a cut away side view illustrating a preferred embodiment of the present invention in a loading state and connected to a harvester.

During filling of the compaction chamber 18, cotton on the bottom of the chamber is compacted some by the weight of the cotton on top of it. This happens whether it is in this chamber 18, or a conventional model builder, boil buggy, cotton stripper basket or any other place a substantial amount of cotton accumulates on top of other cotton. Preferred embodiments of the present invention compensate for this natural compaction by adjusting the vertical orientation of a compression surface, e.g., 14 as shown in FIG. 2

Figure 3:
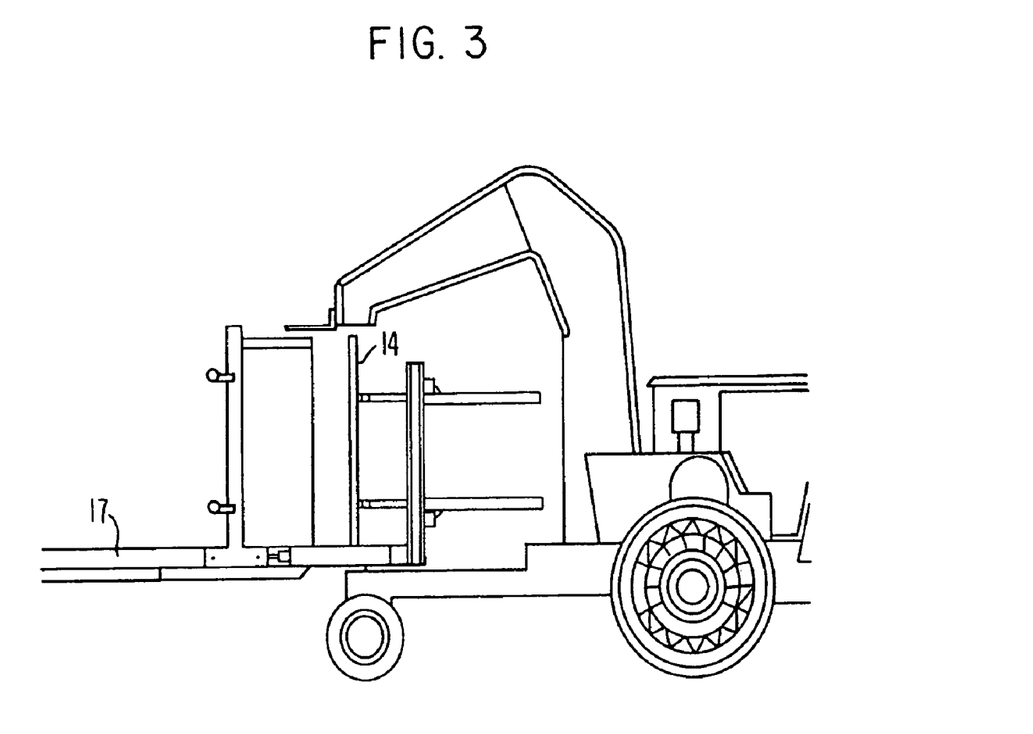
FIG. 3 is a cut away side view illustrating a preferred embodiment of the present invention in a mid-stroke compaction state and connected to a harvester.
Figure 4:
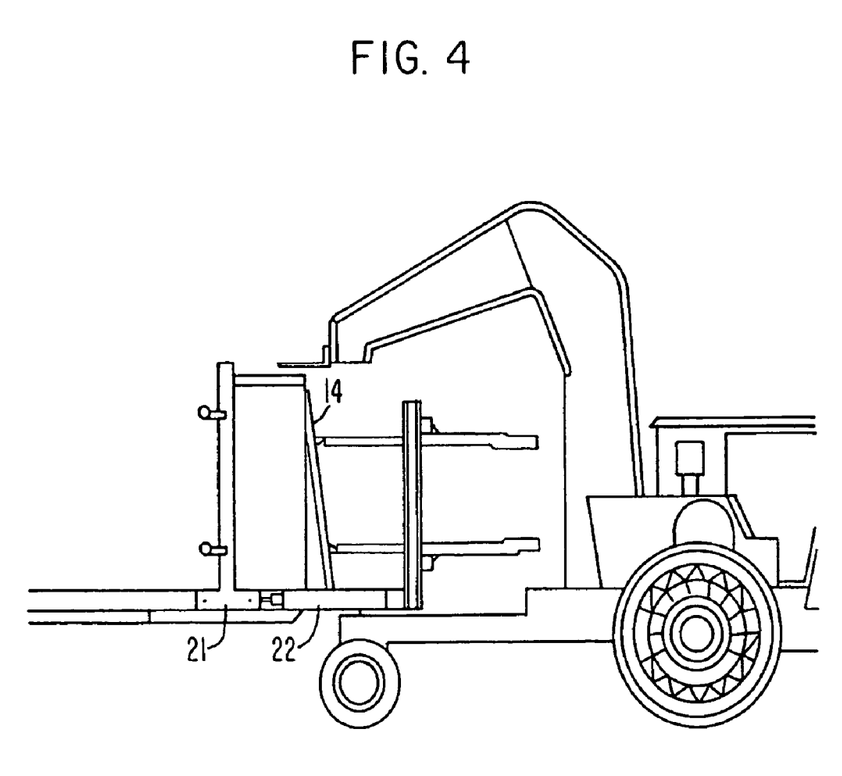
FIG. 4 is a cut away side view illustrating a preferred embodiment of the present invention in a fully compacted state and connected to a harvester.

At the beginning of the cycle the compression surface 14, which has a surface area substantially as large as the end of each module, is tilted forward to compensate for the additional loose cotton required to create a module having substantially uniform density from top to bottom. A frame 15 secures hydraulic power sources 16 that are used to create adjustable angles of the compression surface 14. As the compression cycle proceeds, preferably as it approaches midway as shown in FIG. 3, the compressing surface 14 moves from tilted forward to substantially perpendicular to the floor 17 of the wheeled frame. Approaching the end of the compression cycle, as shown in FIG 4, the compression surface 14 has reached an adjustable hydraulic pressure limit switch (not shown) that presets the compaction level. The surface 14 tilts rearward in the process to create a more evenly dense module as well a properly shaped end to the module. This method of cotton module compaction is repeated continuously from module to module, preferably while the module builder is in motion behind a harvester, providing an advantage over other present day harvesting methods. This compaction cycle does not have to stop from time to time in order to transfer non-compacted cotton to a compactor/module builder, or to an intermediate transport receptacle, therefore enabling the harvest process to proceed unhindered saving harvester down time and labor as well as costs associated with ancillary equipment.

The rear part of the present embodiment is designed to receive, form, size, and offload industry-standard-sized modules in a substantially continuous manner. The continuous nature of this embodiment eliminates a substantial portion of cotton handling down time associated with presently used harvest practices. FIGS. 5 through 8 illustrate the relationships between elements of a preferred embodiment of the invention as a compacted cotton module is moved from the compaction chamber 18 and into the form chamber 19 with sequential resistance applied by the door assembly. As the compacted cotton is pressed from the compaction chamber 18, it enters the form chamber 19. This walled enclosure 19, mounted to the wheeled main frame, creates a compacted cotton flow that is atop and parallel to the wheeled frame 17. The form chamber 19 has two sides, a top and bottom, but is open on front and back and is large enough for a standard sized module to be forced through the enclosure. The rear opening where the compacted module exits is slightly larger than the front opening which joins the compaction chamber opening, i.e., the form chamber 19 is tapered, with the wider portion at the rear. Compaction and forming of the cotton are one undifferentiated process. When construction begins on a module, there is nothing in the form chamber 19. It fills concurrently with the compression chamber 18. After cotton has been pressed through the compaction chamber, the form chamber 19 remains full of compacted cotton. The compacted cotton is unable to fall back into the compression chamber 18 between compression strokes because it is wedged in the tapered form chamber 19. During the remainder of this module's construction, only the compression chamber 18 has room for loose cotton fill. When the module length is approximately equal to its height, although only partially built, it has likely reached the necessary volume to become stable and static enough to be self-sustaining. The fill and compact cycle continues as follows until a module of the desired length is produced. At the end of compaction, compression surface 14, which operates only in the compaction chamber 18 until this point, pushes the compacted module all the way through the form chamber 19, delivering it to the movable floor 23 for off-loading. As a cotton module under construction is forced by the compression surface 14 to exit the form chamber 19 on the enlarged end, the door assembly 21 with doors 20 in the closed position FIG. 5 influences the rate of exodus. Movement of the door frame assembly along the wheeled frame 17 is controlled by an adjustable bypass value (not shown) on a set of hydraulic cylinders 22 attached to the movable doorframe 21 on each side of the wheeled frame 17. This resistance of the door assembly, which acts as a movable wall, against the forces of the compression chamber surface determines module destiny by controlling the rate of the module lengthening process.

Figure 5:
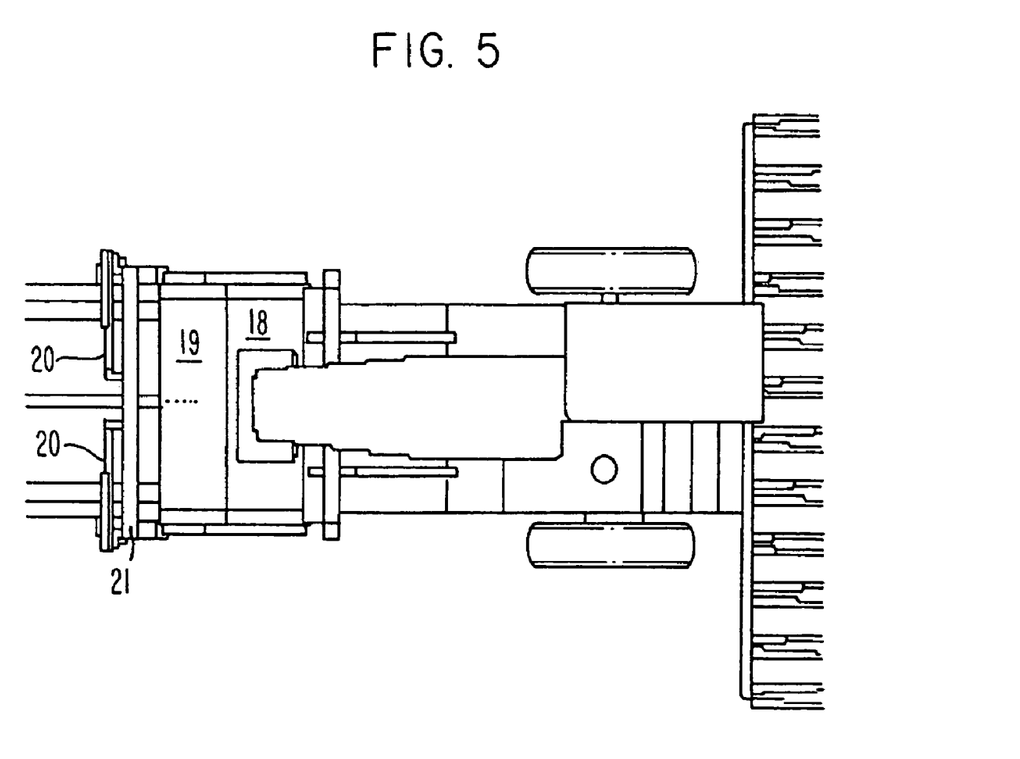
FIG. 5 is a top view of a preferred embodiment of the present invention depicting boundary doors closed and the boundary doorframe approximately mid-way in its travel length.
Figure 6:
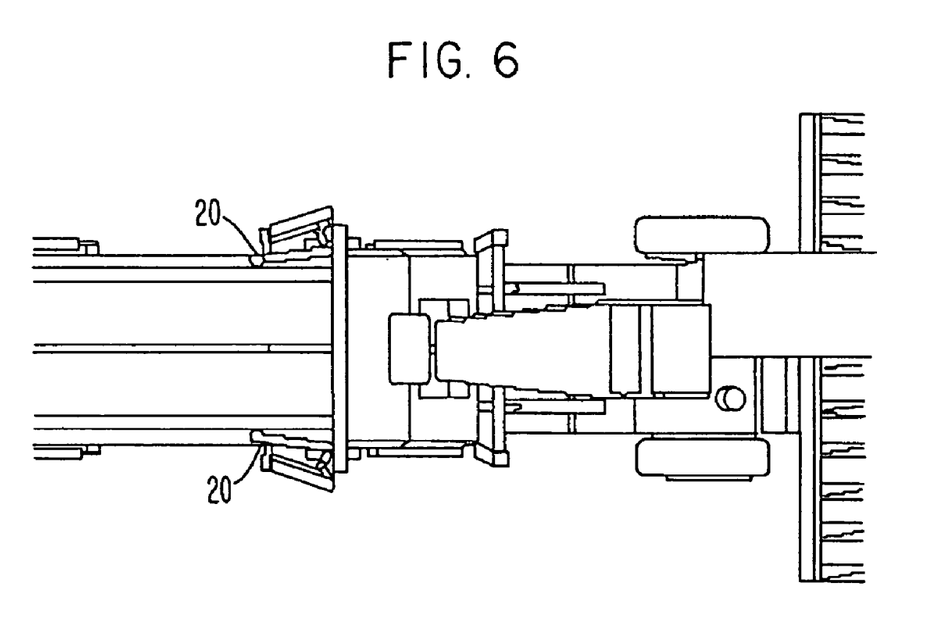
FIG. 6 is a top view of a preferred embodiment of the present invention depicting boundary doors slightly closed for the creation of module resistance and the boundary doorframe in the forward most position.
Figure 7:
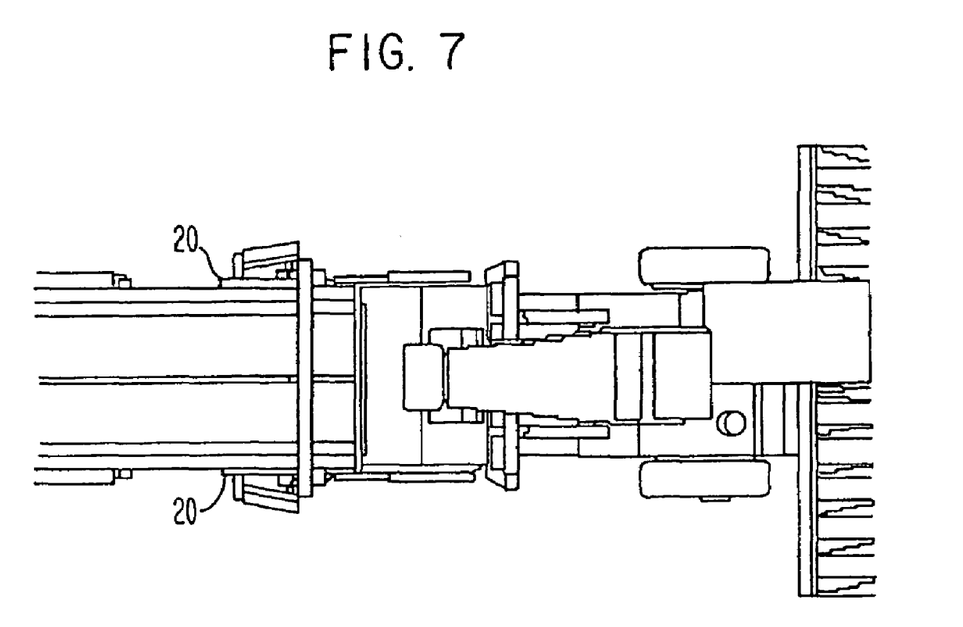
FIG. 7 is a top view of a preferred embodiment of the present invention depicting boundary doors open and the boundary doorframe in its rearward most position.
Figure 8:
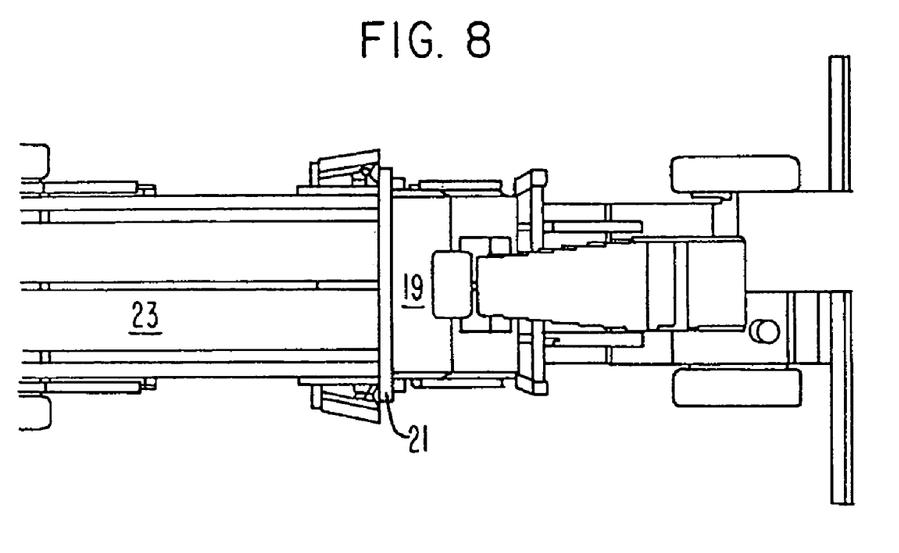
FIG. 8 is a top view of a preferred embodiment of the present invention depicting boundary doors open and the boundary doorframe in its forward most position.
Figure 9:
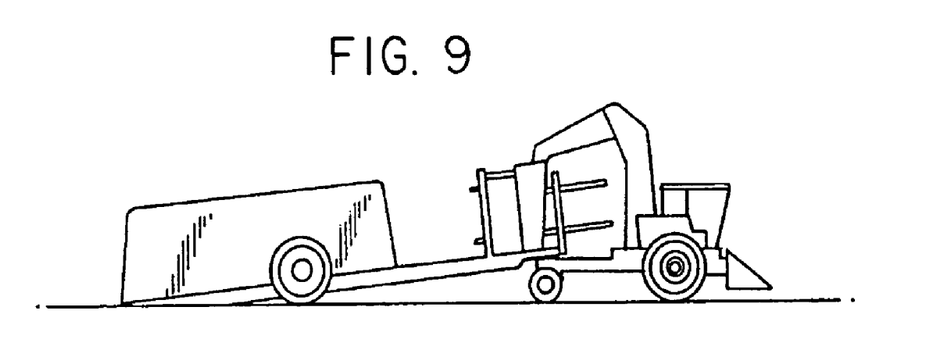
FIG. 9 is a side view of a preferred embodiment of the present invention offloading a finished module.

Forming a module of substantially uniform vertical density from a continuous supply of harvested commodity begins with the concurrent filling of both the form chamber 19 and the compression chamber 18 as described above. The door frame assembly 21 with doors 20 in the closed position moves immediately behind the form chamber 19. As material becomes properly compacted in the form chamber 19, it overrides the bypass valve and begins to exit this chamber 19. The compaction forces on the closed movable doors 20 and door frame 21 cause the whole assembly to gradually be pushed rearward, as shown in FIG. 5 in comparison to FIG. 4, as the module is formed. When the module length is approximately equal to its height although only partially built, it has reached the necessary volume to become stable and static enough to be self-sustaining. The resistance doors 20 fully open as illustrated in FIG. 7 and door frame 21, after being activated by a limit switch (not shown), moves back to its forward most position, as shown in FIG. 8, immediately behind the form chamber 19. The doors 20, by pressure regulated hydraulic cylinders, continue to create resistance on the module, as shown in the figures, to exert pressure against the sides of the module (not shown) as it extrudes from the chamber 19. When the module is completed, e.g., when it reaches standard length, a compression stroke pushes the module through the form chamber 19, using the compression surface 14, as the lateral door pressure is released as illustrated in FIG. 8. With little resistance remaining against the module, a movable floor 23 on the wheeled main frame 17 moves the newly formed module rearward enough for the doors 20 to close and the process to begin again. The rear of the wheeled main frame is lowered to offload the completed module as illustrated in FIG. 9 without having to stop the harvesting or module building process.

In some embodiments of the invention, the movable floor 23 is used (1) to help exit a finished module from the forming chamber 19 and/or (2) to help with the resistance required to maintain uniform density of a module. In some embodiments, the movable floor 23 is operable in two separate sections. One section to support a gradually moving module under construction extending from the forming chamber 19 (leading or trailing edge) to just behind the point of the doors 20 in their rearward most open position. The second section, beginning immediately behind the first and extending to the rear of the wheeled frame 17, to support a finished module waiting for off-loading movable at ground speed. These floors 23 work in unison and independently during each cycle. Additionally, the movable floor 23 is able to run in reverse enabling the machine to serve a dual function as a module mover when not in use harvesting. Another function of the floor 23 in reverse is to pickup a detached wide row header so that the machine may be moved safely down a highway or through narrow passageways.

Preferred embodiments of the invention, because of the pivot point where the wheeled main frame 17 attaches to a stripper/harvester, will turn in substantially the same space requirements of a typical stripper/harvester. On an end turn row, and in some instances while a harvester system incorporating a preferred embodiment of the invention is beginning to strip the next row going forward the jack knifed module builder will actually be backing up so that it can realign itself while the stripper is in the forward motion.

Furthermore, preferred embodiments of the present invention are not limited to the commodity of cotton. It is readily adaptable to a variety of other commodities such as hay or silage. Commodities that embrace preferred embodiments of the present invention will gain great efficiencies of handling and harvesting from its substantially non-stop capabilities and from a finished product that is substantially the same as that created by conventional module builder.

I claim:

1. A module builder comprising:
 a wheeled frame adapted for towing behind a harvester;
 a compaction chamber comprising:
  at least two compaction side walls; and
  a compaction surface oriented between and substantially perpendicular to the compaction sidewalls, nominally vertical, and translatable in a substantially horizontal direction between a leading edge of the compaction chamber and a trailing edge of the compaction chamber at various vertical and near-vertical orientations;
 the compaction chamber coupled to the wheeled frame as to receive material from a harvester delivery system through the compaction chamber top with the compaction surface at the leading edge of the compaction chamber;
 compaction means attached to the wheeled frame, coupled to the compaction surface, and operative to translate the compaction surface in a substantially horizontal direction between the compaction chamber leading edge and the compaction chamber trailing edge at various vertical and near-vertical orientations;
 a forming chamber coupled to the wheeled frame, having a forming chamber leading edge and a forming chamber trailing edge defined therein, the forming chamber leading edge substantially adjoining and aligned with the trailing edge of the compaction chamber, and
 a forming chamber door assembly comprising:
  a substantially vertical forming chamber door frame at least spanning the forming chamber trailing edge, coupled to the wheeled frame, and movable toward and away from the forming chamber trailing edge along the wheeled frame, and at least one substantially vertical forming chamber door mounted on the forming chamber door frame and movable between open and closed states across the forming chamber trailing edge opening; and forming chamber door assembly translation means attached to the wheeled frame, coupled to the forming chamber door frame, and operative to translate the forming chamber door frame in a substantially horizontal direction toward and away from the forming chamber trailing edge.

2. The module builder of claim 1, wherein:
the compaction chamber is coupled to the wheeled frame substantially over a pivot point of the harvester, and
the holding chamber is positioned substantially over the pivot point of the harvester.

3. The module builder of claim 1, further comprising a nominally horizontal movable floor attached to the wheeled frame, extending from at least the trailing edge of the forming chamber to substantially the rear of the wheeled frame, and operative to move material on the movable floor at least in a direction away from the forming chamber trailing edge and drop the material off the module builder.

4. The module builder if claim 3, wherein the movable floor is lowerable to the surface supporting the wheeled frame for off-loading modules.

5. The module builder of claim 1, wherein a forming chamber cross section increases between the forming chamber leading edge and the forming chamber trailing edge.

6. The module builder of claim 1, wherein the at least one door is biased in a closing direction.

7. The module builder of claim 1, wherein the compaction means are hydraulic.

8. A method for forming modules from un-harvested crops, the method comprising:
providing a harvesting system comprising a harvester and a module builder,
the harvester comprising a delivery system,
the module builder comprising:
a wheeled frame adapted for towing behind a harvester;
a compaction chamber comprising:
at least two compaction side walls; and
a compaction surface oriented between and substantially perpendicular to the compaction sidewalls, nominally vertical, and translatable in a substantially horizontal direction between a leading edge of the compaction chamber and a trailing edge of the compaction chamber at various vertical and near-vertical orientations;
the compaction chamber coupled to the wheeled frame as to receive material from a harvester delivery system through the compaction chamber top with the compaction surface at the leading edge of the compaction chamber;
compaction means attached to the wheeled frame, coupled to the compaction surface, and operative to translate the compaction surface in a substantially horizontal direction between the compaction chamber leading edge and the compaction chamber trailing edge at various vertical and near-vertical orientations;
a forming chamber coupled to the wheeled frame, having a forming chamber leading edge and a forming chamber trailing edge defined therein, the forming chamber leading edge substantially adjoining and aligned with the trailing edge of the compaction chamber, and comprising:
a forming chamber door assembly comprising:
a substantially vertical forming chamber door frame at least spanning the forming chamber trailing edge, coupled to the wheeled frame, and movable toward and away from the forming chamber trailing edge along the wheeled frame, and
at least one substantially vertical forming chamber door mounted on the forming chamber door frame and movable between open and closed states across the forming chamber trailing edge opening; and
forming chamber door assembly translation means attached to the wheeled frame, coupled to the forming chamber door frame, and operative to translate the forming chamber door frame in a substantially horizontal direction toward and away from the forming chamber trailing edge; and
in the harvester:
gathering crop from a plurality of plants;
entraining gathered crop in the delivery system;
in the module builder:
beginning with the compaction surface substantially parallel to the compaction chamber leading edge, the door frame releasably secured substantially against the trailing edge of the forming chamber, and the at least one door closed on the door frame, repeating the following steps until a module of preset length is formed:
concurrently filling the compaction chamber and the forming chamber with crop from the harvester delivery system;
upon the fill-level in the compaction chamber reaching a preset level, stopping flow from the harvester;
orienting the compaction surface such that the top end of the compaction surface leans toward the rear of the wheeled frame;
translating the compaction surface horizontally through the compaction chamber to the compaction chamber trailing edge, thereby compacting crop into the forming chamber
translating the compaction surface horizontally through the compaction chamber substantially to the compaction chamber leading edge, and
orienting the compaction surface substantially parallel to the compaction chamber leading edge;
when the horizontal force of formed crop exceeds a preset value, releasing the door frame to move, by the horizontal force of compacted and formed crop, horizontally toward the rear of the module builder;
at a preset point, releasing the at least one door to open, retaining a bias force of the at least one door against the sides of the module as the module passes through the door frame;
upon forming a module of preset length, translating the compaction surface through the forming chamber, thereby moving the forced module toward the rear of the module builder.

9. The method of claim 8 wherein the steps in the module builder occur concurrent with the steps in the harvester.

10. A method for forming modules from harvested crops, the method comprising:
providing a module builder comprising:
a wheeled frame adapted for towing behind a harvester;
a compaction chamber comprising:

at least two compaction side walls; and a compaction surface oriented between and substantially perpendicular to the compaction sidewalls, nominally vertical, and translatable in a substantially horizontal direction between a leading edge of the compaction chamber and a trailing edge of the compaction chamber at various vertical and near-vertical orientations;

the compaction chamber coupled to the wheeled frame as to receive material from the harvester through the compaction chamber top with the compaction surface at the leading edge of the compaction chamber;

compaction means attached to the wheeled frame, coupled to the compaction surface, and operative to translate the compaction surface in a substantially horizontal direction between the compaction chamber leading edge and the compaction chamber trailing edge at various vertical and near-vertical orientations;

a forming chamber coupled to the wheeled frame, having a forming chamber leading edge and a forming chamber trailing edge defined therein, the forming chamber leading edge substantially adjoining and aligned with the trailing edge of the compaction chamber, and comprising:

a forming chamber door assembly comprising:

a substantially vertical forming chamber door frame at least spanning the forming chamber trailing edge, coupled to the wheeled frame, and movable toward and away from the forming chamber trailing edge along the wheeled frame, and at least one substantially vertical forming chamber door mounted on the forming chamber door frame and movable between open and closed states across the forming chamber trailing edge opening; and forming chamber door assembly translation means attached to the wheeled frame coupled to the forming chamber door frame, and operative to translate the forming chamber door frame in a substantially horizontal direction toward and away from the forming chamber trailing edge; and a nominally horizontal movable floor attached to the wheeled frame, extending from at least the trailing edge of the forming chamber to substantially the rear of the wheeled frame, and operative to move material on the movable floor at least in a direction away from the forming chamber trailing edge and drop the material off the module builder;

beginning with the compaction surface substantially parallel to the compaction chamber leading edge, the door frame releasably secured substantially against the trailing edge of the forming chamber, and the at least one door closed on the door frame repeating the following steps until a module of preset length is formed:

concurrently filling the compaction chamber and the forming chamber with crop from the harvester;

upon the fill-level in the compaction chamber reaching a preset level, stopping the flow from the harvester;

orienting the compaction surface such that the top edge of the compaction surface leans toward the rear of the wheeled frame;

translating the compaction surface horizontally through the compaction chamber to the compaction chamber trailing edge, thereby compacting crop into the forming chamber orienting the compaction surface substantially parallel to the compaction chamber leading edge;

when the horizontal force of formed crop exceeds a preset value, releasing the door frame to move, by the horizontal force of compacted and formed crop, horizontally toward the read of the module builder;

at a preset point, releasing the at least one door to open, retaining a bias force of the at least one door against the sides of the module as the module passes through the door frame;

upon forming a module of preset length, translating the compaction surface through the forming chamber, thereby moving the formed module toward the rear of the module builder.

* * * * *

UNITED STATES PATENT AND TRADEMARK OFFICE
CERTIFICATE OF CORRECTION

PATENT NO.         : 7,370,573 B1
APPLICATION NO.    : 11/028049
DATED              : May 13, 2008
INVENTOR(S)        : Weldon Leroy Lackey Page 1 of 1

It is certified that error appears in the above-identified patent and that said Letters Patent is hereby corrected as shown below:

On the Title Page Item (76) Inventor address: Delete "Suite 900 607 Fourteenth St., N.W., Lovington, NM (US) 20005," and insert --5900 E. D Avenue, Lovington, NM (US) 88260-- therefor.

Column 1, line 43, delete "conductive" and insert --conducive-- therefor.

Column 2, line 54, delete "fibroid" and insert --fibrous-- therefor.

Column 4, line 15, delete "model" and insert --module-- therefor.

Column 4, line 15, delete "boil" and insert --boll-- therefor.

Column 4, line 62, insert --both-- after "on" and before "front."

Column 8, line 37 (Claim 8), delete "end" and insert --edge-- therefor.

Column 10 (Claim 10), after line 25 and before line 26, insert --translating the compaction surface horizontally through the compaction chamber substantially to the compaction chamber leading edge, and--.

Column 10, line 30 (Claim 10), delete "read" and insert --rear-- therefor.

Signed and Sealed this

Twenty-third Day of September, 2008

JON W. DUDAS
*Director of the United States Patent and Trademark Office*